US012733012B2

(12) United States Patent
Brown et al.

(10) Patent No.: US 12,733,012 B2
(45) Date of Patent: Sep. 8, 2026

(54) DECODING DOWNLINK CONTROL INFORMATION RECEIVED VIA A DOWNLINK CONTROL CHANNEL

(71) Applicant: VIAVI Solutions Inc., Chandler, AZ (US)

(72) Inventors: Matthew David Brown, Hants (GB); Onur Dizdar, London (GB); Jiancao Hou, Surbiton (GB); Chi-ming Leung, Hardwick (GB); Ata Sattarzadeh Hashemi, Guildford (GB); Yi Xien Yap, Potters Bar (GB); Wei Li, London (GB)

(73) Assignee: VIAVI Solutions Inc., Chandler, AZ (US)

( * ) Notice: Subject to any disclaimer, the term of this patent is extended or adjusted under 35 U.S.C. 154(b) by 556 days.

(21) Appl. No.: 18/170,322

(22) Filed: Feb. 16, 2023

(65) Prior Publication Data

US 2024/0292428 A1 Aug. 29, 2024

(51) Int. Cl.
*H04W 72/23* (2023.01)
*H04L 1/00* (2006.01)
*H04W 72/232* (2023.01)

(52) U.S. Cl.
CPC ......... *H04W 72/232* (2023.01); *H04L 1/0038* (2013.01); *H04L 1/0061* (2013.01)

(58) Field of Classification Search
CPC . H04W 72/2312; H04L 1/0038; H04L 1/0061
See application file for complete search history.

(56) References Cited

U.S. PATENT DOCUMENTS

2016/0249337 A1* 8/2016 Liang .................... H04W 48/12
2018/0192402 A1 7/2018 Shelby et al.
2019/0052487 A1* 2/2019 Shelby ............. H04L 25/03866
2021/0083828 A1* 3/2021 Matsuda ............... H04W 72/04
2021/0288685 A1* 9/2021 Medard ................. H04B 1/123

OTHER PUBLICATIONS

Duffy, K.R., et al., "Ordered Reliability Bits Guessing Random Additive Noise Decoding," Arxiv.Org, Cornell University Library, 201 Olin Library Cornell University Ithaca, NY 14853, Oct. 4, 2020 (Oct. 4, 2020), ?? 081932234, pp. 4528-4542. DOI: 10.1109/ICASSP39728.2021.9414615.

(Continued)

*Primary Examiner* — Ronald B Abelson
(74) *Attorney, Agent, or Firm* — Harrity & Harrity, LLP

(57) ABSTRACT

In some implementations, a user equipment (UE) may perform a decoding of downlink control information (DCI) via a physical downlink control channel (PDCCH) based on: a detection, by the UE, of a UE-specific scrambling sequence and a radio network temporary identifier (RNTI) corresponding to the UE-specific scrambling sequence; and a skipping, by the UE, of a de-scrambling operation prior to the decoding of the DCI, wherein information regarding the UE-specific scrambling sequence and the RNTI is not previously stored by the UE. The UE may refrain from decoding a plurality of possible UE-specific scrambling sequences based on the skipping of the de-scrambling operation prior to the decoding of the DCI.

20 Claims, 6 Drawing Sheets

100

(56) References Cited

OTHER PUBLICATIONS

Extended European Search Report for European Application No. EP241579846 dated Nov. 13, 2024, 19 pages.
Solomon, A., et al., "Soft Maximum Likelihood Decoding using GRAND," ICC 2020-2020 IEEE International Conference on Communications (ICC), IEEE, Jun. 7, 2020 (Jun. 7, 2020), pp. 1-6, XP033798220, DOI: 10.1109/ICC40277.2020.9149208.
Gardner, B.E., et al., "An Efficient Methodology to De-Anonymize the 5G-New Radio Physical Downlink Control Channel," ICASSP 2020—2020 IEEE International Conference on Acoustics, Speech and Signal Processing (ICASSP), 2020, pp. 2917-2921.
Partial European Search Report for Application No. EP24157984, mailed on Jul. 3, 2024, 13 pages.
Richards, C.J., "A Detailed Analysis and Optimization of the Modified Polar Decoding RNTI Recovery Method to Track User Activity in 5G Networks," Sep. 1, 2022 (Sep. 1, 2022), pp. 1-159, XP093176713, Retrieved from the Internet: URL:https://apps.dtic.mil/sti/trecms/pdf/A D1201699.pdf [retrieved on Jun. 19, 2024].
Spreadtrum Communications: "RNTI scrambling for PDCCH Polar code", 3GPP Draft; R1-1717752 RNTI Scrambling for PDCCH Polar Code, 3rd Generation Partnership Project (3GPP), Mobile Competence Centre; 650, Route Des Lucioles ; F-06921 Sophia-Antipolis Cedex ; France vol. RAN WG1, No. Prague, CZ; Oct. 9, 2017-Oct. 13, 2017 Oct. 2, 2017 (Oct. 2, 2017), XP051352290, Retrieved from the Internet: URL: http://www.3gpp.org/ftp/tsg ran/WG1 RL 1/TSGR190b/Docs/ Searched (IPC) [retrieved on Oct. 2, 2017].

* cited by examiner

200

Figure 3:
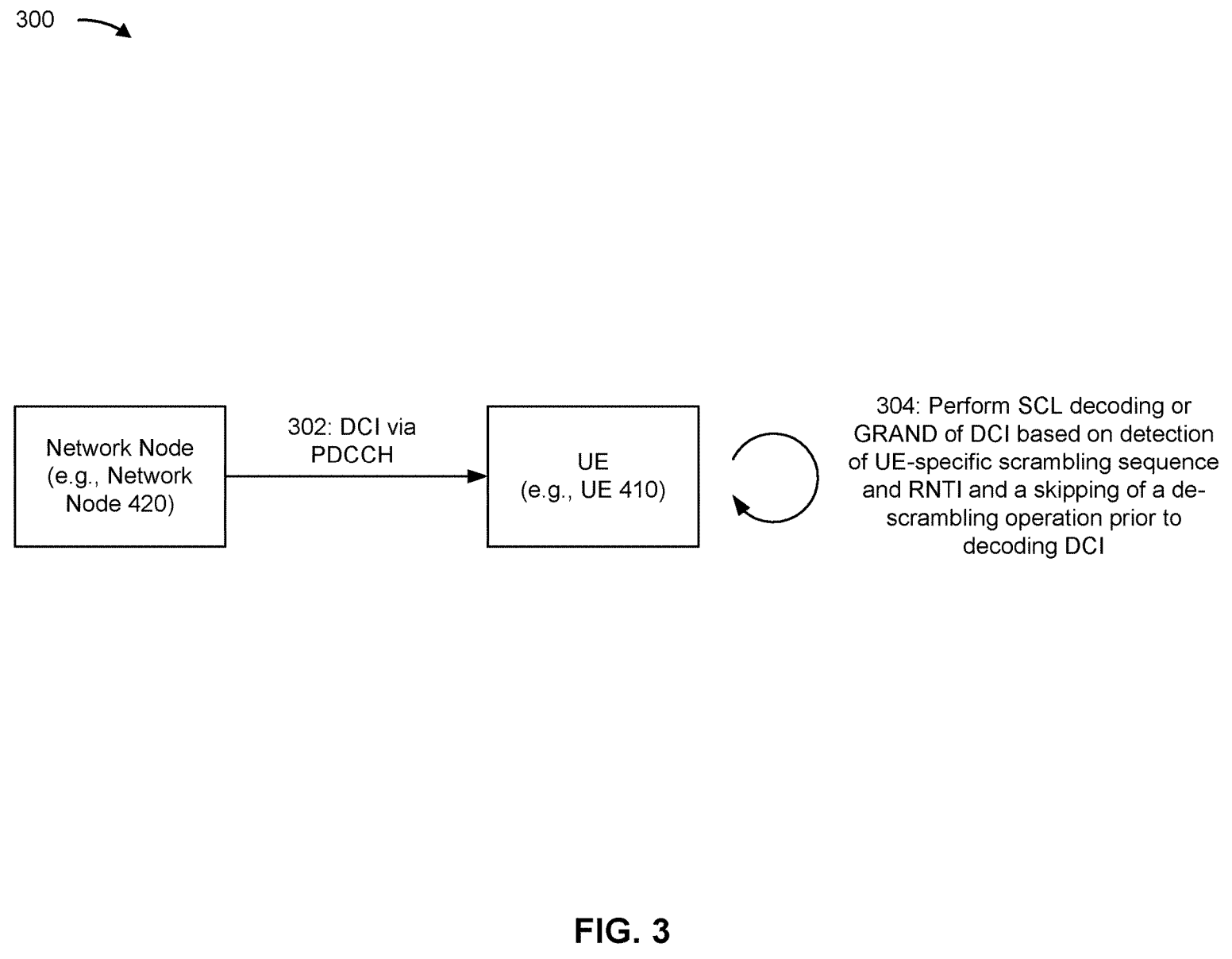

300

Network Node (e.g., Network Node 420)

302: DCI via PDCCH

UE (e.g., UE 410)

304: Perform SCL decoding or GRAND of DCI based on detection of UE-specific scrambling sequence and RNTI and a skipping of a de-scrambling operation prior to decoding DCI

DECODING DOWNLINK CONTROL INFORMATION RECEIVED VIA A DOWNLINK CONTROL CHANNEL

BACKGROUND

Wireless communication systems are widely deployed to provide various telecommunication services such as telephony, video, data, messaging, and broadcasts. A wireless network may include one or more network nodes that support communication for wireless communication devices, such as a user equipment (UE). A UE may communicate with a network node via downlink communications and uplink communications. "Downlink" (or "DL") refers to a communication link from the network node to the UE, and "uplink" (or "UL") refers to a communication link from the UE to the network node.

SUMMARY

In some implementations, a method includes performing a decoding, by a user equipment (UE), of downlink control information (DCI) received via a physical downlink control channel (PDCCH) based on: detecting, by the UE, a UE-specific scrambling sequence and a radio network temporary identifier (RNTI) corresponding to the UE-specific scrambling sequence; and a skipping, by the UE, of a de-scrambling operation prior to the decoding of the DCI, wherein information regarding the UE-specific scrambling sequence and the RNTI is not previously stored by the UE; and refraining, by the UE, from decoding a plurality of possible UE-specific scrambling sequences based on the skipping of the de-scrambling operation prior to the decoding of the DCI.

In some implementations, a receiver includes one or more memories, and one or more processors, communicatively coupled to the one or more memories, configured to: perform a decoding of DCI received via a PDCCH based on: a detection of a receiver-specific scrambling sequence and an RNTI corresponding to the receiver-specific scrambling sequence; and a skipping of a de-scrambling operation prior to the decoding of the DCI, wherein information regarding the receiver-specific scrambling sequence and the RNTI is not previously stored by the receiver; and refraining from decoding a plurality of possible receiver-specific scrambling sequences based on the skipping of the de-scrambling operation prior to the decoding of the DCI.

In some implementations, a non-transitory computer-readable medium storing a set of instructions includes one or more instructions that, when executed by one or more processors of a device, cause the device to: perform a decoding of DCI received via a PDCCH based on: a detection of a device-specific scrambling sequence and an RNTI corresponding to the device-specific scrambling sequence; and a skipping of a de-scrambling operation prior to the decoding of the DCI, wherein information regarding the device-specific scrambling sequence and the RNTI is not previously stored by the device; and refrain from decoding a plurality of possible device-specific scrambling sequences based on the skipping of the de-scrambling operation prior to the decoding of the DCI.

BRIEF DESCRIPTION OF THE DRAWINGS

FIG. 3 is a diagram of an example implementation associated with decoding DCI received via a downlink control channel.

DETAILED DESCRIPTION

Figure 1:
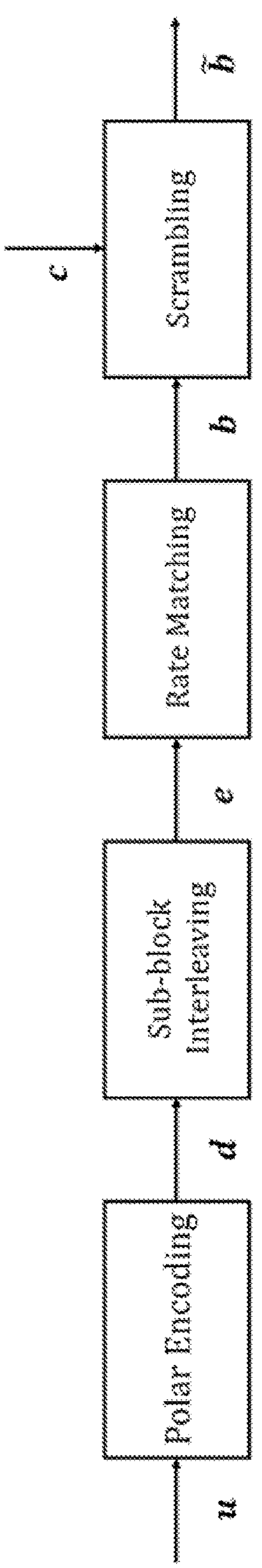
FIG. 1 is a diagram of an example implementation associated with downlink control information (DCI) processing in New Radio (NR) before modulation.

The following detailed description of example implementations refers to the accompanying drawings. The same reference numbers in different drawings may identify the same or similar elements.

In a New Radio (NR) system, downlink control information (DCI) may be carried via a physical downlink control channel (PDCCH). A network node may transmit the DCI via the PDCCH. A UE may receive the DCI via the PDCCH. The DCI may be signaled using physical resource blocks, but an indication of which physical resource blocks are used may not be indicated to the UE, in order to save resources. The UE may perform a blind detection process, where multiple DCI candidates may be monitored to detect and decode any DCI intended for the UE. In blind detection, the UE may perform de-scrambling, de-interleaving, and polar decoding operations for various DCI candidates. The UE may perform a cyclic redundancy check (CRC) after de-masking CRC bits using its radio network temporary identifier (RNTI). The blind decoding process causes a computational burden to the UE.

In some implementations, in order to reduce the detection complexity, the descrambling operation may be skipped, and descrambling may be performed after polar decoding using a properly transformed scrambling sequence, which may remove the requirement to perform polar decoding for all possible UE-specific scrambling sequences. Moreover, a UE-specific scrambling sequence may be detected from the decoded DCI, which may remove the requirement to perform descrambling for all possible UE-specific scrambling sequences.

In some implementations, the UE may detect the DCI and the UE-specific scrambling sequence without performing descrambling over frozen bits of polar codes using successive cancellation list (SCL) decoding. The UE may perform detection of the UE-specific scrambler and the corresponding RNTI by skipping a descrambling operation before decoding and performing an SCL decoding, when the UE-specific scrambler and the RNTI for the downlink transmission are not known at the UE (e.g., the receiver). As a result, the UE may not need to perform SCL decoding for all possible UE-specific scrambling sequences in cases where the descrambling is performed before decoding, thereby saving resources at the UE.

In some implementations, alternatively, the UE may detect the DCI and the UE-specific scrambling sequence without performing descrambling over frozen bits of polar codes using guessing random additive noise decoding (GRAND). The UE may perform detection of the UE-specific scrambler and the corresponding RNTI by skipping a descrambling operation before decoding and performing a polar decoding by GRAND, when the UE-specific scrambler and the RNTI for the downlink transmission are not known at the UE (e.g., the receiver). As a result, the UE may not need to perform polar decoding for all possible UE-specific scrambling sequences in cases where the descrambling is performed before decoding, thereby saving resources at the UE.

FIG. 1 is a diagram of an example 100 implementation associated with DCI processing in New Radio (NR) before modulation. The DCI processing may occur at a transmitter, such as a network node, which is described in more detail below in connection with FIG. 4 and FIG. 5.

As shown by FIG. 1, DCI may be used to carry downlink control information in an NR system. A processing chain for DCI before modulation may be defined. First, a CRC-attached, RNTI masked, and interleaved DCI bit vector, $$u \in \mathbb{F}_2^N,$$

may be encoded by a polar encoder, where $N=2^n$ denotes a codeword length. Polar codes may achieve Shannon's channel capacity for a binary-input symmetric discrete memoryless channel. Polar codes may be constructed by identifying indices of bits in an information vector that detects channels approaching noise-free conditions and using those indices (or some subset of those indices) to transmit information, while setting the remaining indices to predetermined values known by both the encoder and decoder. The indices set to predetermined values may be referred to as "frozen bits." Polar codes are used in NR for physical broadcast channel (PBCH), PDCCH, and physical uplink control channel (PUCCH), due to favorable error correcting performance with advanced decoding algorithms, well-defined structure, and high-throughput decoding algorithms.

Further, $$u \in \mathbb{F}_2^N$$

may denote the uncoded bit vector containing the information bits and redundant bits. The indexes of information bits in the vector u may be selected from the index set denoted by $\mathcal{A}$, whereas the indexes of redundant bits may be selected from the index set denoted by $\mathcal{A}^c$. Denoting the coded bit vector $$d \in \mathbb{F}_2^N,$$

the polar encoding operation may be written as:

$$d = uG,$$

where $$G = F^{\otimes n}, F = \begin{bmatrix} 1 & 0 \\ 1 & 1 \end{bmatrix},$$

and $\otimes$ is the Kronecker product. Addition and multiplication operations may be performed in the binary field $\mathbb{F}_2$. The generator matrix G satisfies $G=G^{-1}$. An alternative representation of x may be written as:

$$d = u_{\mathcal{A}} G_{\mathcal{A}\mathcal{N}} + u_{\mathcal{A}^c} G_{\mathcal{A}^c\mathcal{N}},$$

where $\boldsymbol{u}_{\mathcal{A}}$ $$\in \mathbb{F}_2^K$$

and $\boldsymbol{u}_{\mathcal{A}}$ $$\in \mathbb{F}_2^{(N-K)}$$

are vectors composed of the elements u with indexes from $\mathcal{A}$ and $\mathcal{A}^c$ respectively and $\boldsymbol{G}_{\mathcal{A}\mathcal{N}}$ and $\boldsymbol{G}_{\mathcal{A}^c\mathcal{N}}$ are matrices composed of the rows of G with indexes from $\mathcal{A}$ and $\mathcal{A}^c$, respectively, and columns of G with indexes from $\mathcal{N}=\{1, 2, \ldots, N\}$. By convention and in NR, the elements of vector $\boldsymbol{u}_{\mathcal{A}}$ are set as 0.

After encoding, a sub-block interleaving may be applied to the codeword. After sub-block interleaving, rate-matching may be applied in the forms of shortening, puncturing, and repetition. The length of the codeword after rate-matching may be denoted by E, e.g., b $$\in \mathbb{F}_2^E.$$

In puncturing, the first (N−E) bits of the interleaved codeword may not be transmitted, whereas in shortening, the last (N−E) bits of the interleaved codeword may not be transmitted. In repetition, the first (E−N) bits of the interleaved codeword may be repeated. After rate-matching, the resulting vector b may be scrambled by a scrambling sequence c $$\in \mathbb{F}_2^E,$$

which may result in the vector $$\tilde{b} \in \mathbb{F}_2^E.$$

The scrambling operation after rate matching may be described as:

$$\tilde{b}_i = b_i + c_i,$$

where $\tilde{b}_i$, $b_i$, $c_i \in \mathbb{F}_2$. The sequence c may be defined by:

$$c_i = x_{1,i+N_c} + x_{2,i+N_c},$$

$$x_{1,i+31} = x_{1,i+3} + x_{1,i},$$

$$x_{2,i+31} = x_{2,i+3} + x_{2,i+2} + x_{2,i+1} + x_{2,i},$$

where $N_c=1600$. The sequence $x_1$ may be initialized by $x_{1,0}=1$, $x_{1,i}=0$, i=1, 2, . . . , 30. The sequence $x_2$ may be initialized by $$c_{init} = \sum_{i=0}^{30} x_{2,i} 2^i,$$

where $c_{init}=(n_{RNTI} \cdot 2^{16}+n_{ID})_{mod\ 2^{31}}$.

The parameter $n_{ID} \in \{0, 1, \ldots, 65535\}$ may equal the parameter PDCCH demodulation reference signal (DMRS) scrambling identifier (ID) (pdcch-DMRS-ScramblingID) if configured, and the parameter $n_{RNTI}$ may be equal to a cell radio network temporary identifier (C-RNTI) when the parameter pdcch-DMRS-ScramblingID is configured.

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

The physical resource blocks on which DCI is carried may not be signaled to UEs, in order to save resources. Instead, each UE may perform a blind detection process, where multiple DCI candidates may be monitored to detect and decode any DCI intended for the UE. In blind detection, the UE may perform de-scrambling, de-interleaving, and polar decoding operations for various DCI candidates. The UE may perform a CRC check after de-masking the CRC bits using its RNTI. The blind decoding process may cause a computational burden to the UE, as the blind decoding process may require multiple runs of receiver operations to obtain u from b.

The computational burden may be even higher for multi-UE emulation platforms, where multiple UE IDs need to be monitored for possible transmission. More specifically, monitoring for each UE ID may require performing de-scrambling operations with UE-specific scrambling sequences, each followed by reverse rate-matching, sub-block deinterleaving, and polar decoding operations. Scrambling sequences may be generated in a UE-specific manner based on $n_{ID}$ with 65,536 different initialization seeds, resulting in 65,536 different sequences. In multi-UE emulation platforms, DCI detection may be a challenge when the platform is not instructed about the RNTIs of the transmitting UEs, which may lead to performing 65,536 de-scrambling and decoding operations for each possible candidate. The UE-specific RNTI may be detected by selecting the scrambling sequence and the corresponding RNTI with which the CRC check passes.

In order to reduce the detection complexity, the descrambling operation may be skipped, and descrambling may be performed after polar decoding using a properly transformed scrambling sequence, which may remove the requirement to perform polar decoding for all possible UE-specific scrambling sequences. Moreover, the UE-specific scrambling sequence may be detected from the decoded DCI, which may remove the requirement to perform descrambling for all possible UE-specific scrambling sequences.

In some implementations, the UE may detect the DCI and the UE-specific scrambling sequence without performing descrambling over frozen bits of polar codes using SCL decoding. The DCI may be decoded when the UE-specific scrambling sequence used in the PDCCH is not known at the network node (e.g., the transmitter). The UE may perform detection of the UE-specific scrambler and the corresponding RNTI by skipping a descrambling operation before decoding and performing an SCL decoding, when the UE-specific scrambler and the RNTI for the downlink transmission are not known at the UE (e.g., the receiver). As a result, the UE may not need to perform SCL decoding for all possible UE-specific scrambling sequences in cases where the descrambling is performed before decoding. Such an approach may be targeted to work at high signal-to-noise-ratio (SNR) values and with a non-punctured PDCCH.

In some implementations, alternatively, the UE may detect the DCI and the UE-specific scrambling sequence without performing descrambling over frozen bits of polar codes using GRAND. The DCI may be decoded when the UE-specific scrambling sequence used in the PDCCH is not known at the network node (e.g., the transmitter). The UE may perform detection of the UE-specific scrambler and the corresponding RNTI by skipping a descrambling operation before decoding and performing a polar decoding by GRAND, when the UE-specific scrambler and the RNTI for the downlink transmission are not known at the UE (e.g., the receiver). As a result, the UE may not need to perform polar decoding for all possible UE-specific scrambling sequences in cases where the descrambling is performed before decoding.

Figure 2:
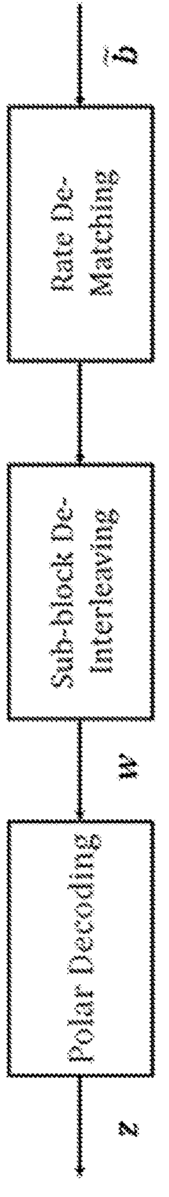
FIG. 2 is a diagram of an example implementation associated with physical downlink control channel (PDCCH) decoding after demodulation with de-scrambling.

FIG. 2 is a diagram of an example implementation 200 associated with PDCCH decoding after demodulation with de-scrambling. The PDCCH decoding may occur at a receiver, such as a UE, which is described in more detail below in connection with FIG. 4 and FIG. 5.

As shown by FIG. 1, a PDCCH decoding chain without de-scrambling may be defined. Input-output relations for polar decoding, sub-block interleaving, rate matching, and scrambling operations may be written in vector-matrix multiplication form. The input-output relations of a polar encoder may be written as:

$$d = uG. \tag{1}$$

Benefiting from the relation $G=G^{-1}$, the following may be defined:

$$u = dG. \tag{2}$$

Next, a sub-block interleaver represented by a matrix D of dimensions N×N may be defined. The interleaver output, $$e \in \mathbb{F}_2^N,$$

may be expressed in terms of d as:

$$e = dD. \tag{3}$$

Using $D^{-1}=D^T$, the corresponding de-interleaving operation may be written as:

$$d=eD^T. \tag{4}$$

In some implementations, the length of the vector b may be redefined as E', e.g., $b\in$ $$\mathbb{F}_2^{E'},$$

where E'=min(E, N). Then, the relation between e and b may be written as $b_{i-k}=e_i$, $\forall i\in\varepsilon$, where $\varepsilon=\{k, k+1, \ldots, k+E'-1\}$. The variable k may depend on the variables E, N, and the rate-matching scheme, and may be expressed as:

$$k=\begin{cases}0, & \text{if } E\geq N,\\ 0, & \text{if } E<N \text{ and shortening is used,}\\ N-E, & \text{if } E<N \text{ and puncturing is used.}\end{cases} \tag{5}$$

In some implementations, for the cases of puncturing, shortening, and repetition, the relations between d and b may be defined as:

$$b=d\,\boldsymbol{D}_{\mathcal{N}\varepsilon}, \tag{6}$$

$$d=b(D^T)_{\varepsilon\mathcal{N}}. \tag{7}$$

In a case where an additional interleaver is used after rate matching and before scrambling, matrix D may be modified to reflect the operation. Further, $\tilde{b}$, $c\in$ $$\mathbb{F}_2^{E'}$$

and b may be related as:

$$\tilde{b}=b+c. \tag{8}$$

As shown in FIG. 2, In some implementations, when de-scrambling is removed, input-output relations for polar decoding, sub-block interleaving, and rate matching may be written in vector-matrix multiplication form. First, $$\mathbb{F}_2^N$$

may be expressed in terms of b and c using Equation (7) and Equation (8) as:

$$\begin{aligned}w&=\tilde{b}(D^T)_{\varepsilon\mathcal{N}}=(b+c)(D^T)_{\varepsilon\mathcal{N}}\\&=d+c(D^T)_{\varepsilon\mathcal{N}}.\end{aligned} \tag{9}$$

In some implementations, $$\mathbb{F}_2^N$$

may be written in terms of b and c using Equation (2) and Equation (9) as follows:

$$\begin{aligned}z&=wG=\left(d+c(D^T)_{\varepsilon\mathcal{N}}\right)G\\&=u+\underbrace{c(D^T)_{\varepsilon\mathcal{N}}G}_{q}.\end{aligned} \tag{10}$$

Alternatively, Equation (10) may be rewritten as:

$$z=u+\underbrace{c'D^TG}_{q}, \tag{11}$$

where $$c'_i=\begin{cases}0, & \text{if } i\in\mathcal{N}\setminus\varepsilon,\\ c_{i-k}, & \text{if } i\in\varepsilon,\end{cases} \tag{12}$$

The vector c', and equivalently c, may be obtained from q by:

$$c'=qGD. \tag{13}$$

In some implementations, the matrices G and D may be invertible, so a one-to-one relationship may exist between q and c', e.g., for each c' (or equivalently c), there exists a unique q. The vector u may include the frozen bits, e.g., $\boldsymbol{u}_{\mathcal{A}^c}\in$ $$\mathbb{F}_2^{(N-K)},$$

and the CRC-attached, RNTI masked, and interleaved DCI bit vector, e.g., $\boldsymbol{u}_{\mathcal{A}}\in$ $$\mathbb{F}_2^K.$$

The frozen bits of the DCI vector may be set to 0, e.g., $\boldsymbol{u}_{\mathcal{A}^c}=0$. Consequently, Equation (11) may be used to derive:

$$\boldsymbol{z}_{\mathcal{A}^c}=q_{\mathcal{A}^c}. \tag{14}$$

In some implementations, in the case of puncturing, e.g., $\varepsilon=\{N-E+1, N-E+2, \ldots, N\}$, Equation (6) and Equation (7) may be rewritten as:

$$b=d_\varepsilon D_{\varepsilon\varepsilon}, \tag{15}$$

$$d_\varepsilon=b(D_{\varepsilon\varepsilon})^T, \tag{16}$$

which may follow from the assumption that the indexes of bits to be non-punctured before interleaving are also in the set $\mathcal{E}$. Since $G_{\mathcal{E}\mathcal{E}}$ is lower triangular with ones (1s) on the diagonal, $d_{\mathcal{E}}=u_{\mathcal{E}}G_{\mathcal{E}\mathcal{E}}$ and $$G_{\mathcal{E}\mathcal{E}}^{-1}$$

may be shown to exist, so that $$u_{\mathcal{E}} = d_{\mathcal{E}} G_{\mathcal{E}\mathcal{E}}^{-1}.$$

Accordingly, Equation (9) and Equation (11) may be rewritten as:

$$w_{\mathcal{E}} = d_{\mathcal{E}} + c(D_{\mathcal{E}\mathcal{E}})^T, \tag{17}$$

$$z_{\mathcal{E}} = u_{\mathcal{E}} + \underbrace{c'\left(D^T\ \right)_{\mathcal{N}\ \mathcal{E}} G_{\mathcal{E}\mathcal{E}}^{-1}}_{q_{\mathcal{E}}}. \tag{18}$$

In some implementations, using $\boldsymbol{u}_{\mathcal{A}}{}^c=0$, the following may be written:

$$\mathbf{z}_{\mathcal{A}\ ^c\cap\mathcal{E}} = q_{\mathcal{A}^c\cap\mathcal{E}}. \tag{19}$$

Equation (14) and Equation (19) may imply that the vector q may be estimated from decoded DCI vector z by observing the bits in the frozen bit locations and determining the q with the same bits in the frozen bit locations. The estimate for q may be denoted as $$\mathbb{F}_2^N.$$

A straightforward approach to obtain q̂ may be to store all q vectors for all possible c vectors and perform an exhaustive search to set q̂ as the q vector satisfying (14) or (19). Once q̂ is obtained, an estimate û∈

$$\mathbb{F}_2^N$$

for u may be obtained by:

$$\hat{u} = z + \hat{q}, \tag{20}$$

In some implementations, the correctness of q̂ may be dependent on the operating SNR since $\boldsymbol{q}_{\mathcal{A}}$ needs to be observed correctly to obtain q̂. However, q̂ may not be unique even if $\boldsymbol{z}_{\mathcal{A}}$ is correctly observed, as multiple c' may yield q vectors with identical bits in $\boldsymbol{q}_{\mathcal{A}}{}^c$. Consequently, the uniqueness of q̂ may be dependent on the number and locations of the indexes in the set $\mathcal{A}$. Nevertheless, if there are multiple estimates q̂, u may be determined using the non-unique multiple q̂ vectors by using each q̂ vector to obtain a different û vector and performing a CRC check to validate û. The CRC in DCI may be masked by the RNTI. Therefore, the RNTI corresponding to q̂ may be determined in scenarios in which the RNTI is not known and the initialization seed for c is calculated from the RNTI. A straightforward approach to obtain the RNTI corresponding to q̂ may be to store RNTI values and q vectors for all possible c vectors, perform an exhaustive search to set q̂ as the q vector satisfying Equation (14) or Equation (19), and select the corresponding RNTI. If the CRC check passes, q̂ and û may be assumed to be estimated correctly.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

FIG. 3 is a diagram of an example implementation 300 associated with decoding DCI received via a downlink control channel. As shown in FIG. 3, example 300 includes communication between a UE (e.g., UE 410) and a network node (e.g., network node 420). In some aspects, the UE and the network node may be included in a wireless network (e.g., network 430).

As shown by reference number 302, the network node may transmit DCI to the UE. The network node may transmit the DCI via a PDCCH. The DCI may carry control information used to schedule user data, a physical downlink shared channel (PDSCH), and a physical uplink shared channel (PUSCH).

As shown by reference number 304, the UE may perform a decoding of the DCI received via the PDCCH. The UE may perform the decoding of the DCI (e.g., the UE may decode the DCI) based on a detection, by the UE, of a UE-specific scrambling sequence and an RNTI corresponding to the UE-specific scrambling sequence, and based on a skipping, by the UE, of a de-scrambling operation prior to the decoding of the DCI. The skipping of the de-scrambling operation involves not performing the de-scrambling operation over frozen bits of polar codes. Information regarding the UE-specific scrambling sequence and the RNTI may not be previously stored by the UE. The UE may refrain from decoding a plurality of possible UE-specific scrambling sequences based on the skipping of the de-scrambling operation prior to the decoding of the DCI.

In some implementations, the decoding may be an SCL decoding. The UE, when performing the SCL decoding, may determine a set of indexes $\mathcal{A}^c$ that includes frozen bit indexes that are common for a plurality of DCI candidates. The UE, when performing the SCL decoding, may start the SCL decoding of a bit-level PDCCH without first performing the de-scrambling operation. The UE, when performing the SCL decoding, may continue the SCL decoding with frozen bit locations treated as information bits up to a predetermined frozen bit location, where the predetermined frozen bit location may be associated with a detection bit location. The UE, when performing the SCL decoding, may obtain frozen bits of a decoded DCI vector $\boldsymbol{z}_{\mathcal{A}}{}^c$ from a path for SCL at the detection bit location. The UE, when performing the SCL decoding, may obtain, from the bits of the decoded DCI vector $\boldsymbol{z}_{\mathcal{A}}{}^c$, a vector q̂ and the RNTI corresponding to the vector q̂. The UE, when performing the SCL decoding, may complete the SCL decoding. Multiple SCL processes may be run with remaining frozen bits set according to the vector $\hat{q}$ and DCI candidate numerologies to obtain multiple decoded sequences, for the vector $\hat{q}$ and each DCI candidate numerology, or a single SCL process may be run by treating remaining bits as information bits to obtain a single decoded sequence. The UE, when performing the SCL decoding, may perform the de-scrambling operation, after the SCL decoding of the DCI, over the single decoded sequence or the multiple decoded sequences, and check an RNTI masked CRC to verify detection for a plurality of possible RNTIs and DCI candidates.

In some implementations, the decoding may be GRAND. The GRAND may be with or without rate matching. The UE, when performing the GRAND, may identify, during a blind detection for the PDCCH, an aggregation level (AL) candidate. The UE, when performing the GRAND, may sort a plurality of putative noise sequences in accordance with a predefined order. The UE, when performing the GRAND, may start the GRAND decoding of a bit-level PDCCH without first performing the de-scrambling operation by applying a next putative noise sequence of the plurality of putative noise sequences. The UE, when performing the GRAND, may obtain a decoded DCI vector $\mathbf{z}_{\mathcal{A}^c}$ for each of a plurality of DCI candidates. The UE, when performing the GRAND, may obtain, from the decoded DCI vector $\mathbf{z}_{\mathcal{A}^c}$, a vector $\hat{q}$ and the RNTI corresponding to the vector $\hat{q}$ for each of the plurality of DCI candidates. The UE, when performing the GRAND, may perform the de-scrambling operation over one or more decoded sequences, and check an RNTI masked CRC to verify detection for a plurality of possible RNTIs and the plurality of DCI candidates. In some implementations, the GRAND may be completed based on a DCI candidate, of the plurality of DCI candidates, and the RNTI passing a CRC check, or remaining putative noise sequences may be applied based on no DCI candidates and no RNTI passing the CRC check. The GRAND may be stopped based on a maximum number of putative noise sequences being applied, or the GRAND may be stopped based on the plurality of putative noise sequences with error bit locations less than or equal to a maximum number of error locations being applied.

DCI Candidate Detection for a PDCCH Using SCL Decoding

In some implementations, the UE may determine the DCI without the descrambling operation using SCL decoding for polar codes. The SCL decoding may improve the error performance of successive cancellation (SC) decoding. The SCL decoding may involve performing L SC decoding operations in parallel and outputting L candidate decoded bit sequences instead of a single decoded bit sequence, as in SC decoding. The SCL decoding may involve SC decoding for L=1. The UE may perform the detection of the UE-specific scrambler and the corresponding RNTI by skipping the descrambling operation and by performing the SCL decoding when the UE-specific scrambler and the RNTI for the downlink transmission are not known at the UE. Consequently, SCL decoding may not need to be performed for all possible UE-specific scrambling sequences for cases in which the descrambling operation is performed before decoding.

In some implementations, the SCL decoding process may be used to decode DCI when the UE-specific sequence used in the PDCCH is not known at the UE (e.g., the receiver). During the SCL decoding process, the UE may determine the set $\mathcal{A}$, which may me u e the frozen bit indexes that are common among all considered DCI candidates. The UE may start SCL decoding of bit level PDCCH without first performing descrambling. The UE may perform SCL decoding with frozen locations treated as information bits up to a predetermined frozen bit location (which may be referred to as a detection bit location), which may be the largest frozen bit location in the set $\mathcal{A}^c$. The UE may obtain $\mathbf{z}_{\mathcal{A}^c}$ from the single path for SC and the most likely path for SCL at the detection bit location. Then, the UE may obtain vector $\hat{q}$ (or vectors $\hat{q}$ if the estimation is non-unique) from $\mathbf{z}_{\mathcal{A}^c}$ and obtain the RNTI corresponding to $\hat{q}$ (or RNTIs if the estimation is non-unique). The UE may complete the SCL decoding. Multiple SCL processes may be run with the remaining frozen bits set according to obtained vector $\hat{q}$ (or vectors $\hat{q}$ if the estimation is non-unique) and DCI candidate numerologies to obtain multiple decoded sequences, for the obtained vector $\hat{q}$ (or vectors $\hat{q}$ if the estimation is non-unique) and each DCI candidate numerology. A single SCL process may be run by treating all remaining bits as information bits to obtain a single decoded sequence. The UE may perform the descrambling over the decoded sequence or multiple decoded sequences using Equation (20) and check the RNTI masked CRC to verify detection for all possible RNTIs and DCI candidates.

In some implementations, an analysis may be performed to show that the detection probability, which may be defined as the probability of detecting $\hat{q}$ correctly given that correct DCI is decoded, of the SCL decoding process may increase with increasing SNR, even though no frozen bits are used in decoding. The polarized channel $$W_N^{(i)}: U_i \rightarrow (Y_1^N, U_1^{i-1}), \forall\, i \in \{0, 1, \ldots, N\}$$

may be defined, with transition probabilities according to:

$$W_N^{(i)}(y_1^N, u_1^{i-1} \mid u_i) = \sum_{u_{i+1}^N \in \{0,1\}^{N-i}} \frac{1}{2^{N-1}} W_N(y_1^N \mid u_1^N G_N), \tag{21}$$

where $$W_N(y_1^N \mid x_1^N) = \prod_{i=1}^N W_N(y_i \mid x_i),\ y_1^N$$

are the observations of the $$x_1^N$$

at the outputs of N copies of a binary symmetric memoryless channel W and $$x_1^N$$

are the codeword bits for the uncoded bit vector $$u_1^N.$$

The SCL may perform sequential decoding, meaning that $u_i$ may be decoded one-by-one in the order of their indexes. At each bit location i, an SCL decoder may calculate the myopic likelihood $$Q_i(\tilde{u}_1^i, y_1^N),$$

where $$\tilde{u}_1^i$$

are partial bit sequences at the decoding paths of the SCL decoder. Further, $$Q_i(\tilde{u}_1^i, y_1^N)$$

may be proportional to $$Pr(U_1^N = \tilde{u}_1^i, Y_1^N = y_1^N).$$

The set of partial sequences may be defined with a larger likelihood than a fraction, α, of that of the true sequence after $u_i$ and may be decoded as:

$$S_\alpha^{(i)}(u_1^i, y_1^N) = \{\tilde{u}_1^i : Q_i(\tilde{u}_1^i, y_1^N) \geq \alpha Q_i(u_1^i, y_1^N)\}, \tag{22}$$

where α≤1 [5]. For α=1, the set may include the paths $$\tilde{u}_1^i$$

that are at least as likely as the true path $$u_1^i$$

at the detection bit location.

When the bits $$z_1^i$$

are assumed to be sufficient to detect $\hat{q}$ uniquely, the detection probability may be inversely related to the cardinality of $$S_1^{(i)}(u_1^i, y_1^N), \text{ e.g.,}$$

$$Pr(\hat{q} = q) \propto \frac{1}{|S_1^{(i)}(u_1^i, y_1^N)|}. \tag{23}$$

The expected value of logarithm of $$|S_\alpha^{(i)}(u_1^i, y_1^N)|$$

may be upper bounded by $$E\{\log_2|S_1^{(i)}(u_1^i, y_1^N|\} \leq \sum_{m\in\{0,\ldots,i\}} H(W_N^{(m)}), \tag{24}$$

where $$H(W_N^{(i)})$$

denotes the entropy of the polarized channel $$W_N^{(i)}.$$

In Equation (24), all bits up to bit location i may be treated as information bits during decoding. Equation (24) may imply that the expected number of decoding paths that are more likely than the true path at bit location i decreases with decreasing uncertainty in the channel (increasing channel reliability). Combining Equation (23) and Equation (24) may result in:

$$Pr(\hat{q} = q) \propto \frac{1}{\sum_{m\in\{0,\ldots,i\}} H(W_N^{(m)})}, \tag{25}$$

which may also imply that the probability of detection increases with increasing channel reliability.

In some implementations, the SCL decoding process, as described herein, may return poor results when puncturing is performed in the PDCCH, even at a relatively high SNR regime. From Equation (15) and Equation (16), the first k bits may be observed to be punctured from the encoded DCI vector, which may be defined as frozen bits according to the 3GPP specifications, which may require setting the corresponding log-likelihood ratio (LLR) values to 0 (zero) at the SCL decoder input for the decoding process. The SCL decoder may obtain the decision LLRs as 0 for the first k decoded bits. Since the SCL decoding is started with frozen locations treated as information bits up to a predetermined frozen bit location, multiple paths may be created during the decoding of the first k bits, which may have the same path metric as the decision LLRs for the bits obtained as 0. When the detection bit location is reached, multiple paths may have the smallest path metric. When $L \leq 2^i$, where i denotes the detection bit location, path eliminations may need to be performed before $\hat{q}$ is estimated, which may result in the path to yield the correct $\hat{q}$ being eliminated, since all paths will have the same path metric. In a case where i is set to satisfy $L \geq 2^i$ instead of the largest frozen bit location that is common among all considered DCI candidates, $\hat{q}$ may be obtained non-uniquely and the number of $\hat{q}$ vectors used to complete the SCL decoding may yield a relatively high computational burden, for practical values of L, such as L≤8 ($\hat{q}$ is non-unique due to both having multiple paths with the same metric and the insufficient number of elements in $\mathbf{z}_{\mathcal{A}^c}$).

In some implementations, the performance of the SCL decoding process may be evaluated in terms of detection probability, false alarm probability, false detection probability, and BLER with respect to SNR. The detection probability is the probability of detecting $\hat{q}$ correctly, given that correct DCI is decoded. The false alarm probability is the probability of detecting a scrambling sequence and a DCI candidate that passes the CRC check even though there is no downlink transmission. The false detection probability is the probability of detecting a false scrambling sequence and a DCI candidate that passes the CRC check. The sets $\mathcal{A}$ and $\mathcal{A}$ may be selected according to the 3GPP specifications. Two DCI candidates with different K values other than the transmitted DCI may be considered to perform blind detection. The coded bits may be modulated by binary phase shift keying (BPSK) and passed through an additive white Gaussian noise (AWGN) channel.

In some implementations, when evaluating the detection, false alarm, and false detection probabilities for N=128 and N=256, respectively, the detection probability for N=256 may be observed to be smaller than that of N=128 for a given SNR. This phenomenon may occur due to the increased probability of error at the decoder input with increase codeword length, the effect of which may be directly observed at the decoder decisions due to lack of frozen bits. The phenomenon may also be verified from Equation (23), where $$H\left(W_N^{(m)}\right)$$

increases with increasing N for $m \in \{0, \ldots, i\}$, which only includes frozen bits. When evaluating the BLER performance for N=128 and N=256, respectively, the BLER performance may be closely related to the detection performance. Accordingly, the BLER performance may be observed to be inversely proportional with the detection probabilities.

DCI Candidate Detection for a PDCCH Using GRAND

In some implementations, the UE may determine the DCI without the descrambling operation using GRAND. GRAND is a decoding technique that is suitable for a block code with structured or unstructured codebooks. GRAND may be used to guess the additive noise on the received codeword. Putative noise sequences may be generated according to their likelihood and subtracted from the received codeword until a valid codeword is obtained. A GRAND decoder may include a putative noise sequence generator and a codebook membership checker. The UE may perform the detection of the UE-specific scrambler and the corresponding RNTI by skipping the descrambling operation and performing GRAND for the PDCCH, with and without rate-matching, when the UE-specific scrambler and the RNTI for the downlink transmission are not known at the UE. Consequently, polar decoding may not need to be performed for all possible UE-specific scrambling sequences in cases in which the descrambling operation is performed before decoding.

In some implementations, GRAND may be used to obtain z from a noisy observation of w. GRAND is a decoding technique based on guessing the additive noise on the noise observation of the codeword. The noise guessing process may be performed by sorting the putative noise sequences starting from the most likelihood one and removing each putative noise sequence from the noisy observation one-by-one until a valid codeword is obtained. The putative noise sequences may be determined by applying a mask over the received noisy codeword, where a reliability threshold may be used to determine the unreliable bits and select the putative noise sequences as combinations of the selected bits.

In some implementations, in GRAND, the noisy observation of d may be denoted as $\bar{d}$ $$\mathbb{F}_2^N,$$

and a putative noise sequence may be denoted as $e \in$ $$\mathbb{F}_2^N.$$

Then, the putative noise sequence may be removed by a simple addition in a binary field as:

$$\hat{d} = \bar{d} + e. \tag{26}$$

In some implementations, the next step for the GRAND decoder may be to check whether $\hat{d}$ is in the codebook of the employed channel coding scheme. In case $\hat{d}$ is a codeword of the channel coding scheme, the decoder may output the decoded bits $\hat{u}$ corresponding to $\hat{d}$. Otherwise, the decoder may move to the putative noise sequence with the next highest likelihood.

In some implementations, the GRAND for polar codes may be without rate matching, as well as for when rate matching is applied. When the rate matching is applied, for a shortening case, Equation (26) may be used for decoding with the noisy vector $\bar{d}$ satisfying $\bar{d}_i=0$, $\forall i \in \mathcal{N} \setminus \varepsilon$. When the rate matching is applied, for a repetition case, Equation (26) may be used as well with the vector $\bar{d}$, which may be obtained from the noisy observation $\bar{b} \in$ $$\mathbb{F}_2^E$$

by applying inverse rate-matching operation for repetition.

In some implementations, a punctured polar code may be decoded by GRAND. The sets $\mathcal{P}, \mathcal{T} \subset \mathcal{N}$ may be defined to represent the sets of bit indexes that are punctured and transmitted, respectively. Then, the punctured and transmitted codeword bits may be expressed as:

$$d_{\mathcal{P}} = u_{\mathcal{P}} G_{\mathcal{P}\mathcal{P}} + u_{\mathcal{T}} \boldsymbol{G}_{\mathcal{T}\mathcal{P}}, \tag{27a}$$

$$d_{\mathcal{T}} = u_{\mathcal{P}} \boldsymbol{G}_{\mathcal{P}\mathcal{T}} + u_{\mathcal{T}} G_{\mathcal{T}\mathcal{T}}. \tag{27b}$$

$\mathcal{P}$ may be chosen to include the frozen bit indexes starting from the first index, and thus, the receiver has a priori knowledge that $\boldsymbol{u}_{\mathcal{P}}=0$. Then, $\boldsymbol{u}_{\mathcal{T}}$ may be obtained by:

$$u_{\mathcal{T}} = (d_{\mathcal{T}} - u_{\mathcal{P}} \boldsymbol{G}_{\mathcal{P}\mathcal{T}}) \boldsymbol{G}_{\mathcal{T}\mathcal{T}}^{-1}. \tag{28}$$

The matrix inverse $$G_{\mathcal{T}\mathcal{T}}^{-1}$$

may exist since $G_{\mathcal{T}\mathcal{T}}$ is lower triangular with ones (1s) on the diagonal. Accordingly, the GRAND decoder may calculate the decoded bit vector $u_{\mathcal{T}}$ from the noisy observation x and a putative noise sequence e using Equation (26) and Equation (28) as:

$$\hat{u}_{\mathcal{T}} = (x_{\mathcal{T}} + e_{\mathcal{T}} - u_{\mathcal{P}} G_{\mathcal{P}\mathcal{T}}) G_{\mathcal{T}\mathcal{T}}^{-1}. \tag{29}$$

Then, the validity of the decoded data may be performed by a CRC check over the information bits in $\hat{u}_{\mathcal{T}}$.

In some implementations, GRAND may be applied to obtain the estimate $\hat{z} \in$ $$\mathbb{F}_2^N$$

from a noisy observation $\overline{w} \in$ $$\mathbb{F}_2^N$$

of w. For a putative noise sequence e, an estimate $\hat{z} \in$ $$\mathbb{F}_2^N$$

for z may be obtained as:

$$\hat{z} = (\overline{w} + e)G. \tag{30}$$

Equation (30) may be valid for the cases without rate-matching, shortening, and puncturing. In the case of shortening, the vectors $\overline{w}$ and e satisfy $\overline{w}_i=0$ and $e_i=0$, respectively, $\forall i \in \mathcal{N} \setminus \varepsilon$. In the case of repetition, $\overline{w}$ may be obtained in accordance with Equation (10), so that $\overline{w}$ includes the first N bits of noisy observation for $\tilde{b}$ after deinterleaving. In the case of puncturing, Equation (30) may be written using Equation (29) as follows:

$$\hat{z}_{\mathcal{T}} = (\overline{w}_{\mathcal{T}} + e_{\mathcal{T}} - z_{\mathcal{P}} G_{\mathcal{P}\mathcal{T}}) G_{\mathcal{T}\mathcal{T}}^{-1}. \tag{31}$$

However, $z_{\mathcal{P}}$ may be unknown due to the omitted descrambling operation. On the other hand, $G_{\mathcal{P}\mathcal{T}}=0$ in accordance with the Third Generation Partnership Project (3GPP) specifications. Accordingly, Equation (31) may be rewritten as:

$$\hat{z}_{\mathcal{T}} = (\overline{w}_{\mathcal{T}} + e_{\mathcal{T}}) G_{\mathcal{T}\mathcal{T}}^{-1}. \tag{32}$$

Using Equation (32), $\hat{q}$ may be obtained by observing the bits in $z_{\mathcal{A}^c \cap \mathcal{T}}$ and proceeding as described herein.

In some implementations, starting from the putative noise sequence e with Hamming weight 0 (zero), the UE may determine $\mathcal{A}^c$ and obtain $\hat{q}$ and the corresponding RNTI from $\hat{z}_{\mathcal{A}^c}$, for each DCI candidate. Then, the UE may obtain a $\hat{u}$ vector using Equation (16) for each $\hat{z}$ and perform a CRC check to determine its validity. If any of the candidate $\hat{u}$ vectors pass the CRC check, the GRAND process may be stopped and $\hat{u}$ may be outputted. If no $\hat{u}$ passes the CRC check, the next most likely putative noise sequence may be analyzed. The GRAND process may be repeated until all possible noise sequences are tried or a stopping condition is satisfied. A possible stopping condition may be to stop decoding when a maximum number of putative noise sequences are tried. Another possible stopping condition may be to stop decoding when all possible putative noise sequences with error bit locations less than or equal to a maximum number of error locations are tried. Various types of GRAND, such as ordered reliability bits GRAND (ORBGRAND) or GRAND with symbol reliability information (SRGRAND) may be used when performing the GRAND process.

In some implementations, the blind detection process for the PDCCH may involve the UE searching through various aggregation levels (ALs) until the correct DCI candidate is discovered, which may result in increased latency, as searching through all candidate ALs may be cumbersome. To avoid the increase in latency, an early termination criterion may be defined, which may allow the GRAND decoder to abort the GRAND process immediately after determining that the considered AL does not contain any downlink transmission. The set of unreliable bit locations may be denoted as $\mathcal{U}$. For each considered AL, the early stopping criterion may involve checking whether the condition $|\mathcal{U}| \leq \tau$ is satisfied, and may abort decoding when the condition $|\mathcal{U}| \leq \tau$ is not satisfied.

In some implementations, the GRAND process may be used to decode DCI when the UE-specific sequence used in the PDCCH is not known at the network node (e.g., the transmitter). The UE may check whether the considered AL contains a downlink transmission using the early termination criterion. The UE may stop the GRAND process when the considered AL does not contain any downlink transmission and the UE may move to the next AL candidate. The early termination criterion may involve checking whether the cardinality of the set of unreliable bit locations obtained by masking the received codeword is smaller or larger than a threshold. The UE may sort the putative noise sequences from most likely to least likely, by setting the most likely putative noise sequence as the noise sequence with Hamming weight 0. The UE may start any type of GRAND of bit level PDCCH without descrambling by applying the next most likely putative noise sequence. The UE may perform GRAND of polar codes using Equation (29), in the case of rate matching. The UE may obtain $z_{\mathcal{A}^c}$ for the cases of no rate-matching, shortening, and repetition, or $z_{\mathcal{A}^c \cap \mathcal{T}}$ for puncturing for each DCI candidate. The UE may obtain vector $\hat{q}$ (or vectors $\hat{q}$ if the estimation is non-unique) from $z_{\mathcal{A}^c}$ or $z_{\mathcal{A}^c \cap \mathcal{T}}$ and obtain RNTI corresponding to $\hat{q}$ (or RNTIs if the estimation is non-unique) for each DCI candidate. The UE may perform descrambling over the decoded sequence or multiple decoded sequences using Equation (29). The UE may check the RNTI masked CRC to verify the detection for all possible RNTIs and DCI candidates. The UE may perform the CRC check, complete the decoding, and output the corresponding DCI candidate and RNTI when a DCI candidate and RNTI pass the CRC check.

In some implementations, when the DCI candidate and the RNTI pass the CRC check, the UE may complete decoding and output the corresponding DCI candidate and RNTI. When no DCI candidates and RNTI pass the CRC check, the UE may again start any type of GRAND of bit level PDCCH without descrambling by applying the next most likely putative noise sequence. The UE may repeat this step until all possible noise sequences are tried or a stopping condition is satisfied. A possible stopping condition may be to stop decoding when a maximum number of putative noise sequences are tried. Another possible stopping condition may be to stop decoding when all possible putative noise sequences with error bit locations less than or equal to a maximum number of error locations are tried.

In some implementations, the performance of the GRAND process may be evaluated in terms of detection probability, false alarm probability, false detection probability, and BLER with respect to SNR. The detection probability is the probability of detecting $\hat{q}$ correctly, given that correct DCI is decoded. The false alarm probability is the probability of detecting a scrambling sequence and a DCI candidate that passes the CRC check even though there is no downlink transmission. The false detection probability is the probability of detecting a false scrambling sequence and a DCI candidate that passes the CRC check. The sets $\mathcal{A}$ and $\mathcal{A}^c$ may be selected according to the 3GPP specifications. Two DCI candidates with different K values other than the transmitted DCI may be considered to perform blind detection. The coded bits may be modulated by BPSK and passed through an AWGN channel. A GRAND with symbol reliability information with abandonment (SRGRANDAB) process may be employed for decoding the bit level PDCCH. The putative error sequences may be determined by masking the bit locations, with a mask error rate (MER) in accordance with MER=[0.1, 0.1, 0.1, 0.05, 0.005, 0.0001, 0.00001] for SNR=[4, 5, 6, 7, 8, 9] dB. The stopping condition for the GRAND may be configured for a maximum number of putative noise sequence trials, which may be set as 5. The early termination threshold may be set as $\tau$=[30, 25, 20, 15, 10, 5] bits for N=128 and $\tau$=[50, 25, 20, 15, 10, 5] bits for N=256 for SNR=[4, 5, 6, 7, 8, 9] dB.

In some implementations, when evaluating the detection, false alarm, and false detection probabilities for N=128 and N=256, respectively, the detection probability for N=256 may be observed to be smaller than that of N=128 for a given SNR. This phenomenon may occur due to the increased probability of error at the decoder input with increased codeword length, which may decrease the probability of identifying the correct putative noise sequence for a given MER and maximum number of trials. In some implementations, when evaluating a block error rate (BLER) performance for N=128 and N=256, respectively, the BLER performance may be inversely proportional to the detection performance. The BLER for N=128 may be observed to decrease faster than that for N=256 in accordance with the detection probability performance of both codeword lengths. In some implementations, when the number of putative noise sequence trials for N=128 and N=256, respectively, are evaluated, the average number of trials may converge to one (1) as the SNR increases, which may imply that the majority of received PDCCHs are received with few or no errors and detection may be performed with relatively low latency. Further, the performance may be improved by adjusting the MER and increasing the maximum number of putative noise sequence trials, resulting in a trade-off between performance and latency.

As indicated above, FIG. 3 is provided as an example. Other examples may differ from what is described with regard to FIG. 3. The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) shown in FIG. 3 may perform one or more functions described as being performed by another set of devices shown in FIG. 3.

Figure 4:
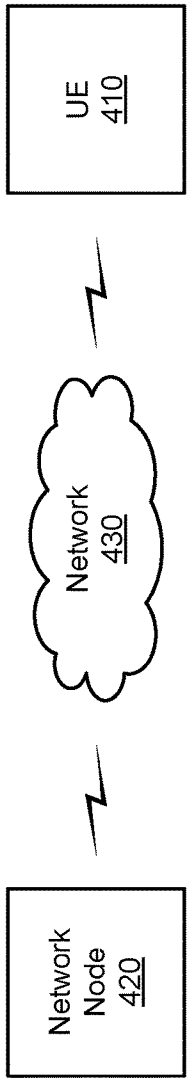
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a UE 410, a network node 420, and a network 430. Devices of environment 400 may interconnect via wired connections, wireless connections, or a combination of wired and wireless connections.

The UE 410 may include one or more devices capable of receiving, generating, storing, processing, and/or providing information associated with decoding DCI received via a downlink control channel, as described elsewhere herein. The UE 410 may include a communication device and/or a computing device. For example, the UE 410 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The network node 420 may include one or more devices capable of receiving, generating, storing, processing, and/or providing information associated with decoding DCI received via a downlink control channel, as described elsewhere herein. The network node 420 may provide communication coverage for a particular geographic area. The network node 420 may include, for example, an NR base station, a Long Term Evolution (LTE) base station, a Node B, an eNB (e.g., in 4G), a gNB (e.g., in 5G), an access point, a transmission reception point (TRP), a distributed unit (DU), a radio unit (RU), a central unit (CU), a mobility element of a network, a core network node, a network element, a network equipment, a radio access network (RAN) node, or a combination thereof. The network node 420 may refer to an aggregated base station, a disaggregated base station, an integrated access and backhaul (IAB) node, a relay node, or one or more components thereof.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
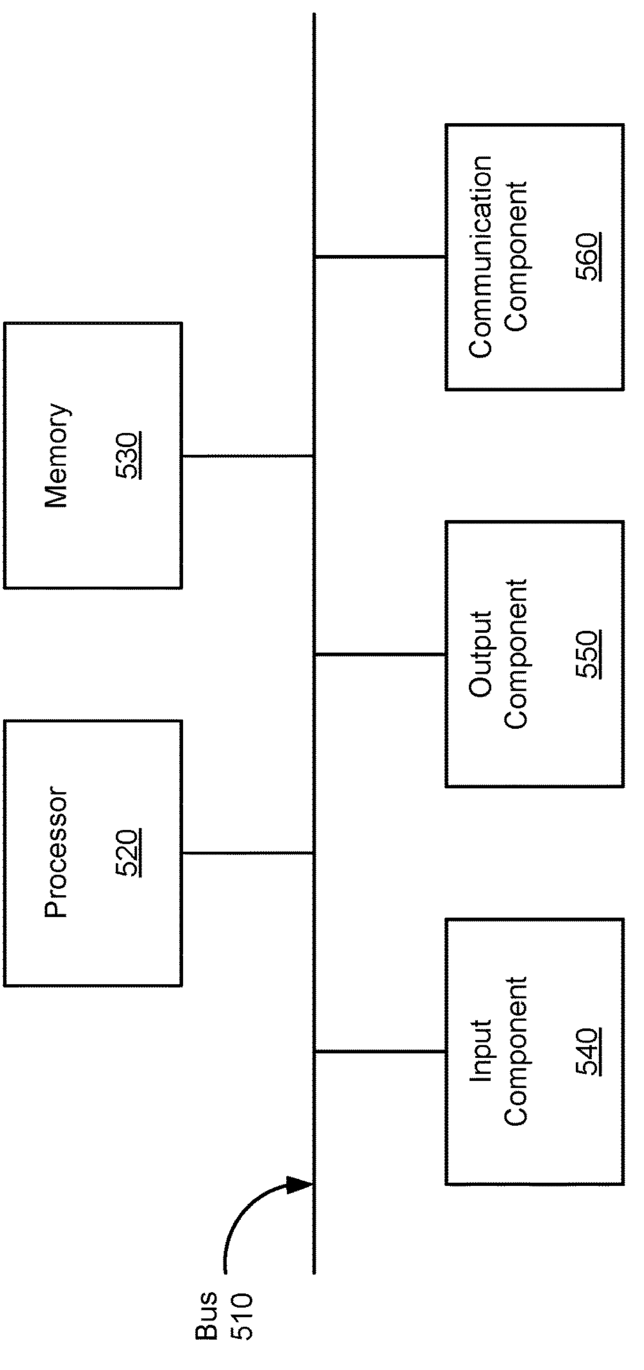
FIG. 5 is a diagram of example components of one or more devices of FIG. 4.

FIG. 5 is a diagram of example components of a device 500 associated with decoding DCI received via a downlink control channel. The device 500 may correspond to UE 410 and/or network node 420. In some implementations, UE 410 and/or network node 420 may include one or more devices 500 and/or one or more components of the device 500. As shown in FIG. 5, the device 500 may include a bus 510, a processor 520, a memory 530, an input component 540, an output component 550, and/or a communication component 560.

The bus 510 may include one or more components that enable wired and/or wireless communication among the components of the device 500. The bus 510 may couple together two or more components of FIG. 5, such as via operative coupling, communicative coupling, electronic coupling, and/or electric coupling. For example, the bus 510 may include an electrical connection (e.g., a wire, a trace, and/or a lead) and/or a wireless bus. The processor 520 may include a central processing unit, a graphics processing unit, a microprocessor, a controller, a microcontroller, a digital signal processor, a field-programmable gate array, an application-specific integrated circuit, and/or another type of processing component. The processor 520 may be implemented in hardware, firmware, or a combination of hardware and software. In some implementations, the processor 520 may include one or more processors capable of being programmed to perform one or more operations or processes described elsewhere herein.

The memory 530 may include volatile and/or nonvolatile memory. For example, the memory 530 may include random access memory (RAM), read only memory (ROM), a hard disk drive, and/or another type of memory (e.g., a flash memory, a magnetic memory, and/or an optical memory). The memory 530 may include internal memory (e.g., RAM, ROM, or a hard disk drive) and/or removable memory (e.g., removable via a universal serial bus connection). The memory 530 may be a non-transitory computer-readable medium. The memory 530 may store information, one or more instructions, and/or software (e.g., one or more software applications) related to the operation of the device 500. In some implementations, the memory 530 may include one or more memories that are coupled (e.g., communicatively coupled) to one or more processors (e.g., processor 520), such as via the bus 510. Communicative coupling between a processor 520 and a memory 530 may enable the processor 520 to read and/or process information stored in the memory 530 and/or to store information in the memory 530.

The input component 540 may enable the device 500 to receive input, such as user input and/or sensed input. For example, the input component 540 may include a touch screen, a keyboard, a keypad, a mouse, a button, a microphone, a switch, a sensor, a global positioning system sensor, an accelerometer, a gyroscope, and/or an actuator. The output component 550 may enable the device 500 to provide output, such as via a display, a speaker, and/or a light-emitting diode. The communication component 560 may enable the device 500 to communicate with other devices via a wired connection and/or a wireless connection. For example, the communication component 560 may include a receiver, a transmitter, a transceiver, a modem, a network interface card, and/or an antenna.

The device 500 may perform one or more operations or processes described herein. For example, a non-transitory computer-readable medium (e.g., memory 530) may store a set of instructions (e.g., one or more instructions or code) for execution by the processor 520. The processor 520 may execute the set of instructions to perform one or more operations or processes described herein. In some implementations, execution of the set of instructions, by one or more processors 520, causes the one or more processors 520 and/or the device 500 to perform one or more operations or processes described herein. In some implementations, hardwired circuitry may be used instead of or in combination with the instructions to perform one or more operations or processes described herein. Additionally, or alternatively, the processor 520 may be configured to perform one or more operations or processes described herein. Thus, implementations described herein are not limited to any specific combination of hardware circuitry and software.

The number and arrangement of components shown in FIG. 5 are provided as an example. The device 500 may include additional components, fewer components, different components, or differently arranged components than those shown in FIG. 5. Additionally, or alternatively, a set of components (e.g., one or more components) of the device 500 may perform one or more functions described as being performed by another set of components of the device 500.

Figure 6:
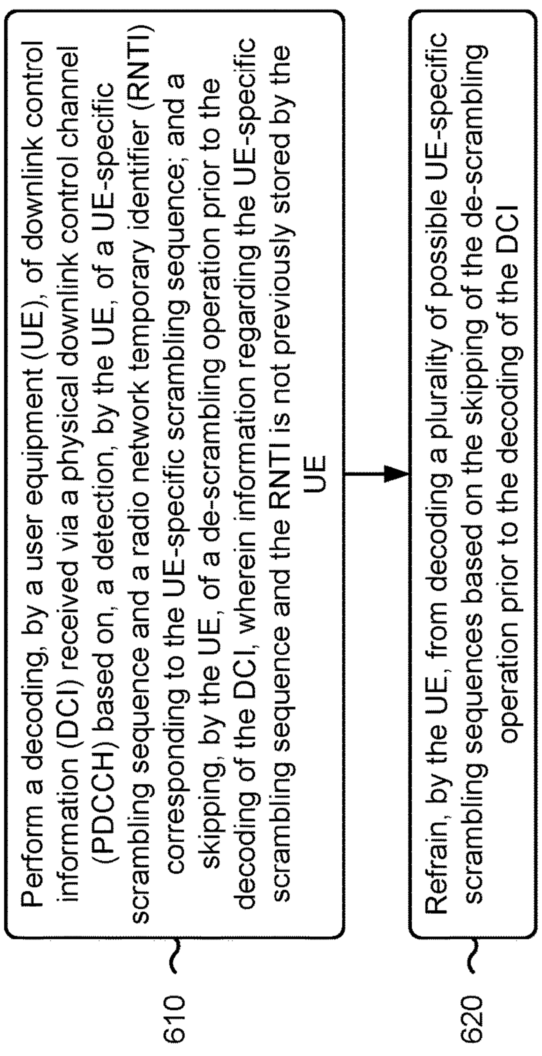
FIG. 6 is a flowchart of an example process relating to decoding DCI received via a downlink control channel.
Figure 6:

FIG. 6 is a flowchart of an example process 600 associated with decoding DCI received via a downlink control channel. In some implementations, one or more process blocks of FIG. 6 may be performed by a UE (e.g., UE 410). In some implementations, one or more process blocks of FIG. 6 may be performed by another device or a group of devices separate from or including the UE, such as a network node (e.g., network node 420). Additionally, or alternatively, one or more process blocks of FIG. 6 may be performed by one or more components of device 500, such as processor 520, memory 530, input component 540, output component 550, and/or communication component 560.

As shown in FIG. 6, process 600 may include performing a decoding of DCI received via a PDCCH based on: a detection, by the UE, of a UE-specific scrambling sequence and an RNTI corresponding to the UE-specific scrambling sequence, and a skipping, by the UE, of a de-scrambling operation prior to the decoding of the DCI, wherein information regarding the UE-specific scrambling sequence and the RNTI is not previously stored by the UE (block 610). For example, the UE may perform a decoding of DCI received via a PDCCH based on: a detection, by the UE, of a UE-specific scrambling sequence and an RNTI corresponding to the UE-specific scrambling sequence, and a skipping, by the UE, of a de-scrambling operation prior to the decoding of the DCI, wherein information regarding the UE-specific scrambling sequence and the RNTI is not previously stored by the UE, as described above. In some implementations, the skipping of the de-scrambling operation involves not performing the de-scrambling operation over frozen bits of polar codes.

As further shown in FIG. 6, process 600 may include refraining from decoding a plurality of possible UE-specific scrambling sequences based on the skipping of the de-scrambling operation prior to the decoding of the DCI (block 620). For example, the UE may refrain from decoding a plurality of possible ULE-specific scrambling sequences based on the skipping of the de-scrambling operation prior to the decoding of the DCI, as described above.

In some implementations, the decoding is a successive cancellation list (SCL) decoding. In some implementations, performing the SCL decoding comprises determining a set of indexes that includes frozen bit indexes that are common for a plurality of DCI candidates, starting the SCL decoding of a bit-level PDCCH without first performing the de-scrambling operation, continuing the SCL decoding with frozen bit locations treated as information bits up to a predetermined frozen bit location, wherein the predetermined frozen bit location is associated with a detection bit location, obtaining frozen bits of a decoded DCI vector from a path for successive cancellation and a path for SCL at the detection bit location, obtaining, from the bits of the decoded DCI vector, a vector and an RNTI corresponding to the vector, completing the SCL decoding, wherein multiple SCL processes are run with remaining frozen bits set according to the vector and DCI candidate numerologies to obtain multiple decoded sequences, for the vector and each DCI candidate numerology, or wherein a single SCL process is run by treating remaining bits as information bits to obtain a single decoded sequence, and performing the de-scrambling operation, after the SCL decoding of the DCI, over the single decoded sequence or the multiple decoded sequences and checking an RNTI masked CRC to verify detection for a plurality of possible RNTIs and DCI candidates.

In some implementations, the decoding is a GRAND. In some implementations, the GRAND is with rate matching. In some implementations, the GRAND is without rate matching. In some implementations, performing the GRAND comprises identifying, during a blind detection for the PDCCH, an AL candidate, sorting a plurality of putative noise sequences in accordance with a predefined order, starting the GRAND of a bit-level PDCCH without first performing the de-scrambling operation by applying a next putative noise sequence of the plurality of putative noise sequences, obtaining a decoded DCI vector for each of a plurality of DCI candidates, obtaining, from the decoded DCI vector, a vector and the RNTI corresponding to the vector for each of the plurality of DCI candidates, and performing the de-scrambling operation over one or more decoded sequences and checking an RNTI masked CRC to verify detection for a plurality of possible RNTIs and the plurality of DCI candidates.

In some implementations, the GRAND is completed based on a DCI candidate, of the plurality of DCI candidates, and the RNTI passing a CRC check, or remaining putative noise sequences are applied based on no DCI candidates and no RNTI passing the CRC check. In some implementations, the GRAND is stopped based on a maximum number of putative noise sequences being applied, or the GRAND is stopped based on the plurality of putative noise sequences with error bit locations less than or equal to a maximum number of error locations being applied.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

performing a successive cancellation list (SCL) decoding, by a user equipment (UE), of downlink control information (DCI) received via a physical downlink control channel (PDCCH) based on:

detecting, by the UE, of a UE-specific scrambling sequence and a radio network temporary identifier (RNTI) corresponding to the UE-specific scrambling sequence; and skipping, by the UE, a de-scrambling operation prior to the SCL decoding, wherein performing the SCL decoding comprises:

starting the SCL decoding of a bit-level PDCCH without first performing the de-scrambling operation;

continuing the SCL decoding with frozen bit locations treated as information bits up to a predetermined frozen bit location associated with a detection bit location;

obtaining frozen bits of a decoded DCI vector from a path for successive cancellation and a path for SCL at the detection bit location;

obtaining, from the frozen bits of the decoded DCI vector, a vector and an RNTI corresponding to the vector;

completing the SCL decoding to obtain one or more decoded sequences; and performing the de-scrambling operation after SCL decoding and over the one or more decoded sequences, and wherein information regarding the UE-specific scrambling sequence and the RNTI is not previously stored by the UE; and refraining, by the UE, from decoding a plurality of possible UE-specific scrambling sequences based on the skipping of the de-scrambling operation prior to the SCL decoding.

2. The method of claim 1, wherein the skipping of the de-scrambling operation involves not performing the de-scrambling operation over frozen bits of polar codes.

3. The method of claim 1, wherein performing the SCL decoding further comprises: determining a set of indexes that includes frozen bit indexes that are common for a plurality of DCI candidates.

4. The method of claim 1, wherein multiple SCL processes are run with remaining frozen bits set according to the vector and DCI candidate numerologies to obtain multiple decoded sequences for the vector and each DCI candidate numerology.

5. The method of claim 1, wherein a single SCL process is run by treating remaining bits as information bits to obtain a single decoded sequence.

6. The method of claim 1, further comprising:

checking an RNTI masked cyclic redundancy check (CRC) to verify detection for a plurality of possible RNTIs and DCI candidates.

7. The method of claim 3, further comprising:

evaluating a signal-to-noise ratio (SNR) of the PDCCH; and selecting, based on the SNR, a subset of SCL decoding paths corresponding to DCI candidates of the plurality of DCI candidates.

8. A receiver, comprising:

one or more memories; and one or more processors, coupled to the one or more memories, configured to:

perform a successive cancellation list (SCL) decoding of downlink control information (DCI) received via a physical downlink control channel (PDCCH) based on:

a detection of a receiver-specific scrambling sequence and a radio network temporary identifier (RNTI) corresponding to the receiver-specific scrambling sequence; and a skipping of a de-scrambling operation prior to the SCL decoding, wherein, to perform the SCL decoding, the one or more processors are configured to:

start the SCL decoding of a bit-level PDCCH without first performing the de-scrambling operation;

continue the SCL decoding with frozen bit locations treated as information bits up to a predetermined frozen bit location associated with a detection bit location;

obtain frozen bits of a decoded DCI vector from a path for successive cancellation and a path for SCL at the detection bit location;

obtain, from the frozen bits of the decoded DCI vector, a vector and an RNTI corresponding to the vector;

complete the SCL decoding to obtain one or more decoded sequences; and perform the de-scrambling operation after SCL decoding and over the one or more decoded sequences, and wherein information regarding the receiver-specific scrambling sequence and the RNTI is not previously stored by the receiver; and refrain from decoding a plurality of possible receiver-specific scrambling sequences based on the skipping of the de-scrambling operation prior to the SCL decoding.

9. The receiver of claim 8, wherein the skipping of the de-scrambling operation involves not performing the de-scrambling operation over frozen bits of polar codes.

10. The receiver of claim 8, wherein the one or more processors, to perform the SCL decoding, are further configured to:

determine a set of indexes that includes frozen bit indexes that are common for a plurality of DCI candidates.

11. The receiver of claim 8, wherein multiple SCL processes are run with remaining frozen bits set according to the vector and DCI candidate numerologies to obtain multiple decoded sequences for the vector and each DCI candidate numerology.

12. The receiver of claim 8, wherein a single SCL process is run by treating remaining bits as information bits to obtain a single decoded sequence.

13. The receiver of claim 8, wherein the one or more processors are further configured to:

check an RNTI masked cyclic redundancy check (CRC) to verify detection for a plurality of possible RNTIs and DCI candidates.

14. The receiver of claim 10, wherein the one or more processors are further configured to:

evaluate a signal-to-noise ratio (SNR) of the PDCCH; and select, based on the SNR, a subset of SCL decoding paths corresponding to DCI candidates of the plurality of DCI candidates.

15. A non-transitory computer-readable medium storing a set of instructions, the set of instructions comprising:

one or more instructions that, when executed by one or more processors of a device, cause the device to:

perform a successive cancellation list (SCL) decoding of downlink control information (DCI) received via a physical downlink control channel (PDCCH) based on:

a detection of a device-specific scrambling sequence and a radio network temporary identifier (RNTI) corresponding to the device-specific scrambling sequence; and a skipping of a de-scrambling operation prior to the SCL decoding, wherein the one or more instructions that, when executed by the one or more processors to perform the SCL decoding, cause the device to:

start the SCL decoding of a bit-level PDCCH without first performing the de-scrambling operation;

continue the SCL decoding with frozen bit locations treated as information bits up to a predetermined frozen bit location associated with a detection bit location;

obtain frozen bits of a decoded DCI vector from a path for successive cancellation and a path for SCL at the detection bit location;

obtain, from the frozen bits of the decoded DCI vector, a vector and an RNTI corresponding to the vector;

complete the SCL decoding to obtain one or more decoded sequences; and perform the de-scrambling operation after SCL decoding and over the one or more decoded sequences, and wherein information regarding the device-specific scrambling sequence and the RNTI is not previously stored by the device; and refrain from decoding a plurality of possible device-specific scrambling sequences based on the skipping of the de-scrambling operation prior to the SCL decoding.

16. The non-transitory computer-readable medium of claim 15, wherein the skipping of the de-scrambling operation involves not performing the de-scrambling operation over frozen bits of polar codes.

17. The non-transitory computer-readable medium of claim 15, wherein the one or more instructions that, when executed by the one or more processors to perform the SCL decoding, cause the device to:

determine a set of indexes that includes frozen bit indexes that are common for a plurality of DCI candidates.

18. The non-transitory computer-readable medium of claim 15, wherein multiple SCL processes are run with remaining frozen bits set according to the vector and DCI candidate numerologies to obtain multiple decoded sequences for the vector and each DCI candidate numerology.

19. The non-transitory computer-readable medium of claim 15, wherein a single SCL process is run by treating remaining bits as information bits to obtain a single decoded sequence.

20. The non-transitory computer-readable medium of claim 15, wherein the one or more instructions that, when executed by the one or more processors to perform the SCL decoding, further cause the device to:

check an RNTI masked cyclic redundancy check (CRC) to verify detection for a plurality of possible RNTIs and DCI candidates.

* * * * *